United States Patent
Chazelas et al.

(10) Patent No.: US 12,469,949 B2
(45) Date of Patent: Nov. 11, 2025

(54) METASURFACE DEVICE

(71) Applicants: ULTIMETAS, Paris (FR); PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR); SORBONNE UNIVERSITE, Paris (FR)

(72) Inventors: Jean Chazelas, Paris (FR); Charlotte Tripon-Canseliet, Issy les Moulineaux (FR)

(73) Assignees: ULTIMETAS, Paris (FR); PARIS SCIENCES ET LETTRES, Paris (FR); ECOLE SUPERIEURE DE PHYSIQUE ET DE CHIMIE INDUSTRIELLES DE LA VILLE DE PARIS, Paris (FR); CENTRE NATIONAL DE LA RECHERCHE SCIENTIFIQUE, Paris (FR); SORBONNE UNIVERSITE, Paris (FR)

(*) Notice: Subject to any disclaimer, the term of this patent is extended or adjusted under 35 U.S.C. 154(b) by 382 days.

(21) Appl. No.: 18/018,030

(22) PCT Filed: Jul. 20, 2021

(86) PCT No.: PCT/EP2021/070295
§ 371 (c)(1),
(2) Date: Jan. 25, 2023

(87) PCT Pub. No.: WO2022/023126
PCT Pub. Date: Feb. 3, 2022

(65) Prior Publication Data
US 2023/0268633 A1    Aug. 24, 2023

(30) Foreign Application Priority Data
Jul. 30, 2020 (FR) .................................. 2008101

(51) Int. Cl.
*H04B 10/43* (2013.01)
*H01Q 1/06* (2006.01)
(Continued)

(52) U.S. Cl.
CPC ............ *H01Q 1/06* (2013.01); *H01Q 1/1207* (2013.01); *H01Q 1/24* (2013.01)

(58) Field of Classification Search
CPC .......... H01Q 1/06; H01Q 1/1207; H01Q 1/24; H01Q 3/247; H01Q 3/2676;
(Continued)

(56) References Cited

U.S. PATENT DOCUMENTS 6,175,332 B1    1/2001  Fedors
8,223,423 B2    7/2012  Haberfelde et al.
(Continued)

FOREIGN PATENT DOCUMENTS

EP    2 341 579 A1     7/2011
WO    2019/219708 A1   11/2019

OTHER PUBLICATIONS

Singaporean Search Report issued in Singaporean Patent Application No. 11202300653W dated Jul. 9, 2024.

*Primary Examiner* — Andrew Wendell
(74) *Attorney, Agent, or Firm* — BakerHostetler (57) ABSTRACT

A metasurface device includes an antenna element formed on the front surface of a substrate, the antenna element comprising a two-dimensional array of electrically conductive patches spaced from one another and having dimensions smaller than the operating wavelength of an emission and/or reception device, the antenna element being able to radiate (Continued)

in a direction having a component perpendicular to the front surface of the substrate when the ground structure has a ground plane function, the substrate comprising a layer, called a connection layer, made of photoconductive semiconductor material, in direct physical contact with the conductive patches, the semiconductor material being insulating when it is not illuminated and able to be conductive when it is illuminated at a reconfiguration wavelength.

10 Claims, 10 Drawing Sheets

(51) Int. Cl.
  *H01Q 1/12* (2006.01)
  *H01Q 1/24* (2006.01)

(58) Field of Classification Search
  CPC .. H01Q 15/0086; H04B 10/43; H04B 10/506; H04B 1/04; H04B 1/16; H04B 1/40
  See application file for complete search history.

(56) References Cited

U.S. PATENT DOCUMENTS

| | | | | |
|---|---|---|---|---|
| 10,186,771 | B2 * | 1/2019 | Bowden | H01Q 1/36 |
| 10,193,233 | B1 * | 1/2019 | Gregoire | H01Q 15/14 |
| 10,615,506 | B1 | 4/2020 | Feng et al. | |
| 12,142,832 | B2 * | 11/2024 | Chazelas | H01Q 3/247 |
| 2003/0180998 | A1 * | 9/2003 | Yokohama | H10K 30/451 |
| | | | | 257/E31.098 |
| 2014/0085693 | A1 * | 3/2014 | Mosallaei | G02B 1/002 |
| | | | | 359/107 |
| 2014/0097995 | A1 * | 4/2014 | McKinzie, III | H01Q 21/26 |
| | | | | 29/601 |
| 2017/0025765 | A1 * | 1/2017 | Quarfoth | H01Q 21/065 |
| 2018/0083364 | A1 * | 3/2018 | Foo | H01Q 15/0026 |
| 2021/0111477 | A1 * | 4/2021 | Foo | H01Q 1/2266 |
| 2021/0367341 | A1 * | 11/2021 | Hasan Abadi | H01Q 21/065 |

* cited by examiner

METASURFACE DEVICE

CROSS-REFERENCE TO RELATED APPLICATIONS

This application is a National Stage of International patent application PCT/EP2021/070295, filed on Jul. 20, 2021, which claims priority to foreign French patent application No. FR 2008101, filed on Jul. 30, 2020, the disclosures of which are incorporated by reference in their entirety.

FIELD OF THE INVENTION

The field of the invention is that of metasurface devices, for example metasurface antennas. The invention is applicable to microwave devices.

BACKGROUND

Such devices may be used in various applications, such as radar applications in avionics and aerospace, high-speed communication and space telecommunications.

Patent application WO2019219708 discloses an antenna device comprising a substrate, a ground plane formed on a rear surface of the substrate and an antenna element formed on the front surface of the substrate and comprising a first array of conductive patches separated by switches arranged between the conductive patches. The antenna device comprises an electromagnetic-wave source configured and arranged to generate a surface wave on the front face of the substrate. The surface wave is transformed by the two-dimensional array of conductive patches into leaky waves that are emitted in a direction having a component perpendicular to the front surface of the substrate. The electrical connection of certain conductive patches to one another makes it possible to form an array of groups of patches that are connected to one another. This solution makes it possible, without using phase shifters, to control the main direction of the emission pattern of the antenna and therefore to produce electronically scanned antennas at a low cost.

That patent application proposes to arrange electrically controlled switches, such as for example MEMS or diodes, between the adjacent conductive patches so as to make it possible to selectively electrically connect the adjacent patches to one another. However, this solution exhibits a certain number of drawbacks. It notably generates electromagnetic interference that deforms the radiation pattern of the metasurface device. Moreover, the control of the switches may prove to be too slow.

SUMMARY OF THE INVENTION

One aim of the invention is to limit at least one of the abovementioned drawbacks.

To this end, the subject of the invention is a metasurface device comprising:
- a substrate having a rear surface and a front surface, the substrate comprising a ground structure able to have a ground plane function,
- an emission and/or reception device able to emit and/or receive an electromagnetic wave, the emission and/or reception device being configured and arranged such that the wave is able to propagate in the form of a surface wave over the front surface of the substrate,
- an antenna element comprising a two-dimensional array of electrically conductive patches arranged on the front surface of the substrate, being spaced from one another and having dimensions smaller than the operating wavelength of the emission and/or reception device, the antenna element being able to radiate, under the effect of the propagation of a surface wave over the front surface of the substrate, in a direction having a component perpendicular to the front surface of the substrate when the ground structure has a ground plane function,
- the substrate comprising a layer, called a connection layer, made of photoconductive semiconductor material, in direct physical contact with the conductive patches, the semiconductor material being insulating when it is not illuminated and able to be conductive when it is illuminated at a wavelength called a reconfiguration wavelength.

Advantageously, the metasurface device comprises an optical reconfiguration device able to illuminate a set of at least one area, called illuminated area, of the connection layer such that the connection layer is conductive only in the set of at least one illuminated area, so as to electrically connect, in pairs, the metal patches of the antenna element that are separate and connected by a continuous area of the connection layer that is located completely within an illuminated area of the set of at least one illuminated area so as to form at least one group of conductive patches that are electrically connected to one another.

Advantageously, the optical reconfiguration device comprises a single optical reconfiguration source able to emit an optical beam at the reconfiguration wavelength and a diffractive optical device that makes it possible, using the optical beam, through diffraction, to illuminate the set of at least one illuminated area at the reconfiguration wavelength.

Advantageously, the diffractive device makes it possible to illuminate an array of continuous illuminated areas of the connection layer that are separated by areas of the connection layer or a set of at least one illuminated area delimiting areas of the connection layer that are not illuminated by the diffractive device.

As a variant, the set of at least one illuminated area comprises a single illuminated area.

Advantageously, the diffractive device is able to alternately illuminate various sets of at least one illuminated area of the connection layer.

Advantageously, the metasurface device comprises a ground structure able to have a ground plane function, the ground structure being able to be alternately in an insulating state, in which it prevents the propagation of the surface wave over the front surface of the substrate from the emission and/or reception device to the conductive patches, or vice versa, and in a conductive state, in which the ground structure has a ground plane function, allowing the propagation of the surface wave over the front surface of the substrate from the emission and/or reception device to the conductive patches, or vice versa, the ground layer being able to change from the insulating state to the conductive state through illumination of the ground layer by an optical beam at a wavelength called a switching wavelength.

The reconfiguration device may be configured and arranged to illuminate the substrate on the rear face or on the front face.

In the case of illumination on the front face, the diffractive device may be mounted on a cover of the metasurface device, the cover being placed facing the antenna element at a distance from the antenna element, or be in the shape of a substantially flat plate extending in a plane substantially perpendicular to the surface or front face of the substrate.

BRIEF DESCRIPTION OF THE DRAWINGS

Other features, details and advantages of the invention will become apparent upon reading the description, given with reference to the appended drawings, which are given by way of example and in which, respectively.

DETAILED DESCRIPTION

In the remainder of the text, conductive is understood to mean electrically conductive and insulating is understood to mean electrically insulating.

An optical beam is understood to mean a beam whose wavelength is located in the optical domain comprising the infrared, the ultraviolet and the visible.

Figure 1:
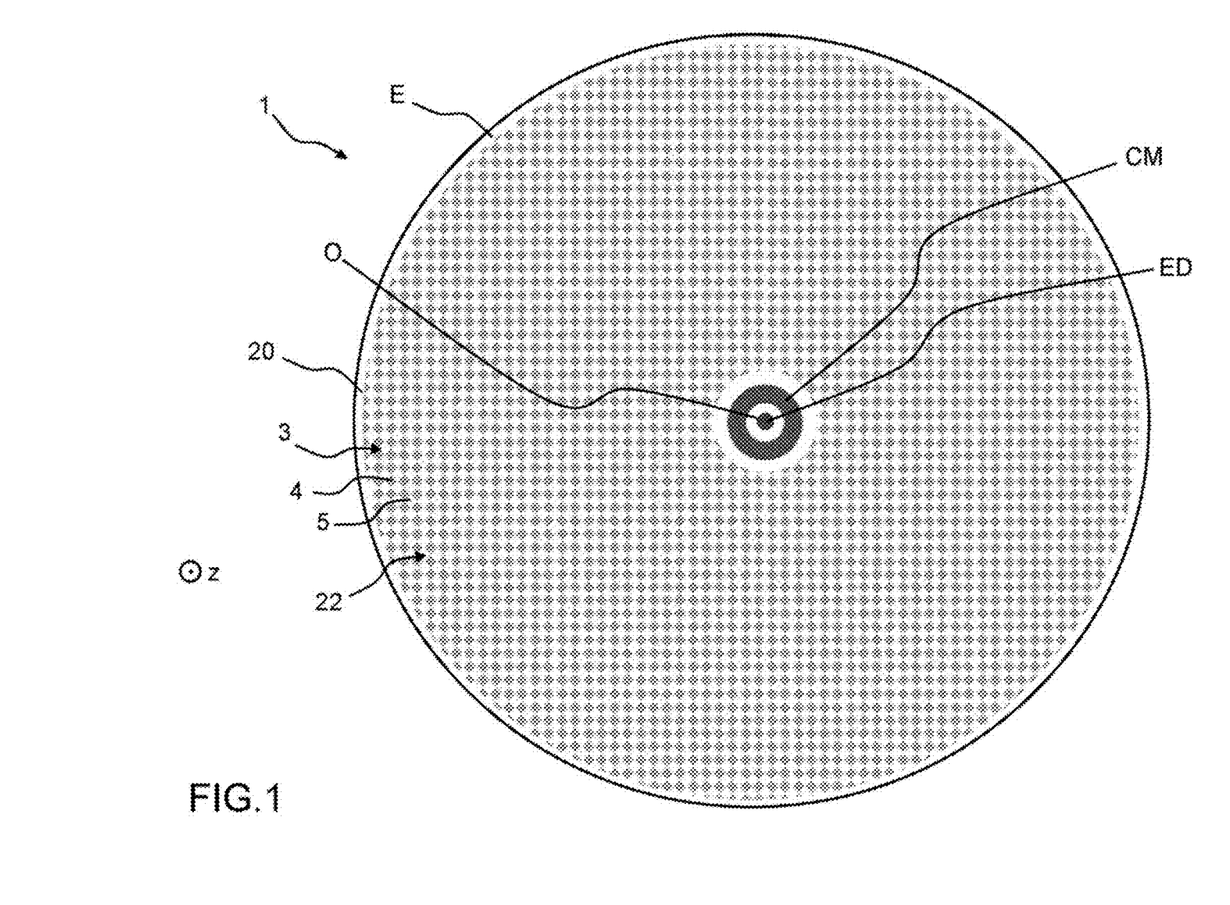
FIG. 1 schematically illustrates a plan view of a metasurface device according to the invention, FIG. 2 schematically illustrates, more precisely, a plan view of a portion of the antenna element of the device of FIG. 1, FIG. 3 schematically illustrates another example of an antenna element, FIG. 4 schematically illustrates a sectional view of the device of FIG. 1, FIG. 5 schematically illustrates an exploded view of the device of FIG. 1, FIG. 6 schematically illustrates a sectional view of a first variant of the device, in which the stack is illuminated on the front face, FIG. 7 schematically illustrates a sectional view of a second variant of the device, in which the stack is illuminated on the front face, FIG. 8 schematically illustrates a sectional view of a third variant of the metasurface device, FIG. 9 schematically illustrates a sectional view of a fourth variant of the metasurface device, FIG. 10 schematically illustrates a sectional view of a fifth variant of the metasurface device.

FIG. 1 schematically illustrates a plan view of a metasurface device 1 according to the invention.

The metasurface device 1 comprises a stack E of layers stacked along a stacking axis z perpendicular to the plane of FIG. 1. The stack comprises a substrate 2, a conductive central ring CM and an antenna element 3 formed around the conductive central ring CM. The conductive central ring CM is spaced from a central channel O and from the antenna element 3.

The substrate 20 comprises a front surface 22 and a rear face 21. The front and rear faces of the various layers of the stack E are defined along an axis z going in the direction from the rear to the front.

The antenna element 3 comprises a two-dimensional periodic array of conductive patches 4 arranged on the front surface 22 of the substrate 20 and being spaced from one another. The conductive patches 4 are separated by openings 5. The antenna element 3 constitutes a metasurface.

The conductive patches 4 are for example patches made of metal or indium tin oxide (ITO), just like the metal ring CM.

The conductive patches 4 and the openings 5 are substantially self-complementary. Unlike a metasurface consisting of conductive patches 4 and of openings 5 that are strictly self-complementary, the conductive patches 4 of the antenna element 3 are separated from one another, as may be seen in FIG. 2, which shows a portion of the antenna element or metasurface 3.

Figure 2:
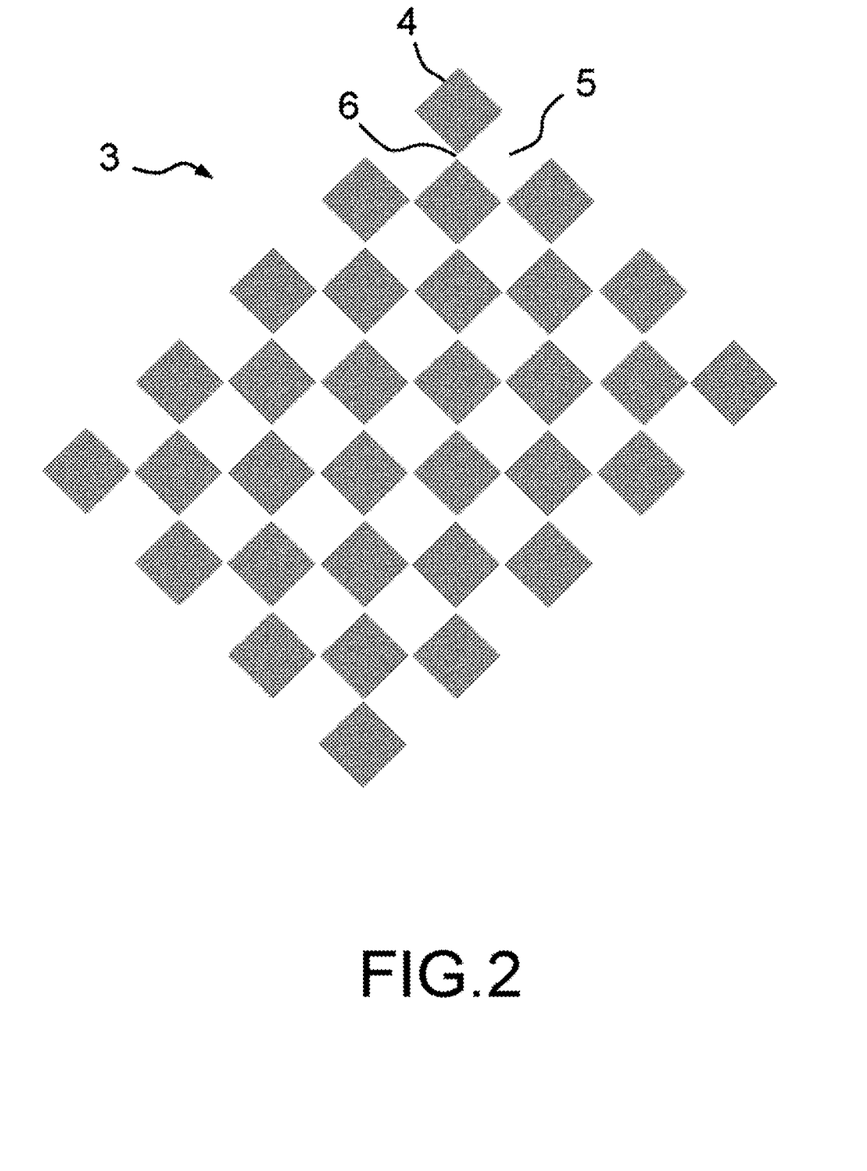

In other words, the closest points of two adjacent conductive patches 4 are separated by a gap 6. The openings 5 are therefore larger than the conductive patches 4.

The antenna element 3 therefore comprises gaps 6 separating the patches that are adjacent in terms of their adjacent vertices.

In the non-limiting example of FIG. 1, the antenna element 3 has substantially a checkerboard structure. The openings 5 and the conductive patches 4 are substantially square in shape.

The conductive patches 4 may have a strictly square shape or a substantially square shape with clipped or flattened vertices. They may have a different shape, such as for example an oval or rounded shape.

The conductive patches 4 have sub-wavelength sides or dimensions. The same applies for the pitch of the array.

Advantageously, the conductive patches 4 have dimensions or sides of lengths less than or equal to $\lambda/50$, and preferably between $\lambda/50$ and $\lambda/100$. $\lambda$ is the operating wavelength of the metasurface device, that is to say of the wave radiated by the antenna element 3.

The size of the gap 6, that is to say the minimum distance between two adjacent patches, which may be the distance between two vertices of two adjacent conductive patches 4, is between $\lambda/1000$ and $\lambda/2000$. For an antenna operating at the frequency 30 GHz, the wavelength is approximately 10 mm in air, the sides of the patches have a length of between 100 and 200 µm and the distance between patches 4 that are adjacent in terms of their vertices is between 5 and 10 µm.

Other metasurfaces comprising conductive patches 4 and substantially self-complementary openings 5 are conceivable. The patches 4 and/or the openings 5 may for example have substantially shapes of equilateral triangles, crosses or ovals. The conductive patches are thus arranged in rows and columns. The columns may or may not be perpendicular in relation to the columns.

In the example of FIG. 1, the conductive patches 4 all have one and the same orientation in a two-dimensional reference frame tied to the front face of the substrate. As a variant, some conductive patches may have different orientations in a two-dimensional reference frame tied to the front face of the substrate.

In the example of FIG. 1, the conductive patches 4 all have one and the same shape and the same dimensions. As a variant, some conductive patches have different shapes and/or different dimensions.

Figure 3:
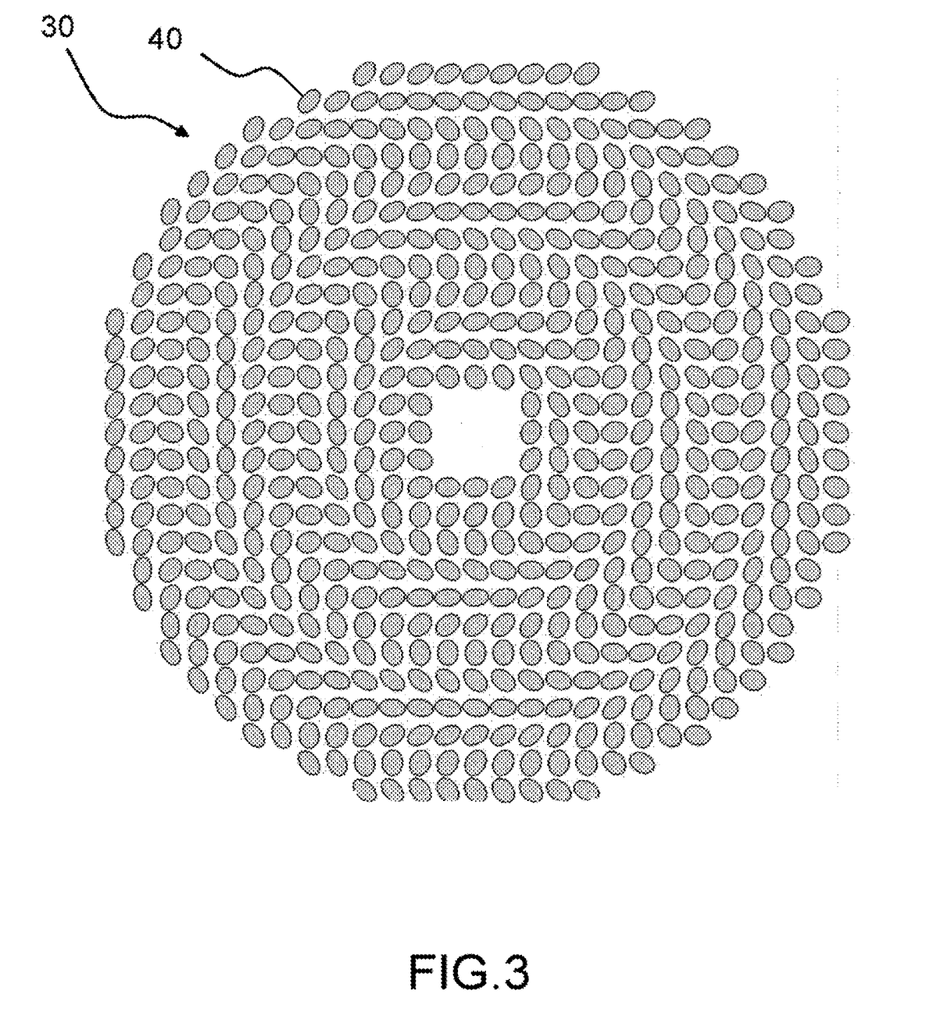

FIG. 3 shows a metasurface 30 in which the conductive patches 40 have substantially an oval shape. The conductive patches are not all identical. Some conductive patches differ from other conductive patches in terms of their shapes and their orientations in a two-dimensional reference frame tied to the front face of the substrate.

The selective electrical connection between conductive patches 4 makes it possible to form a reconfigurable antenna element 3, that is to say one able to exhibit different radiation patterns based on one and the same excitation. This makes it possible for example to obtain a multi-scale antenna element that may comprise a two-dimensional array of conductive patches that are electrically insulated from one another or a two-dimensional array of groups of conductive patches that are electrically connected to one another, as will be seen below.

Figure 4:
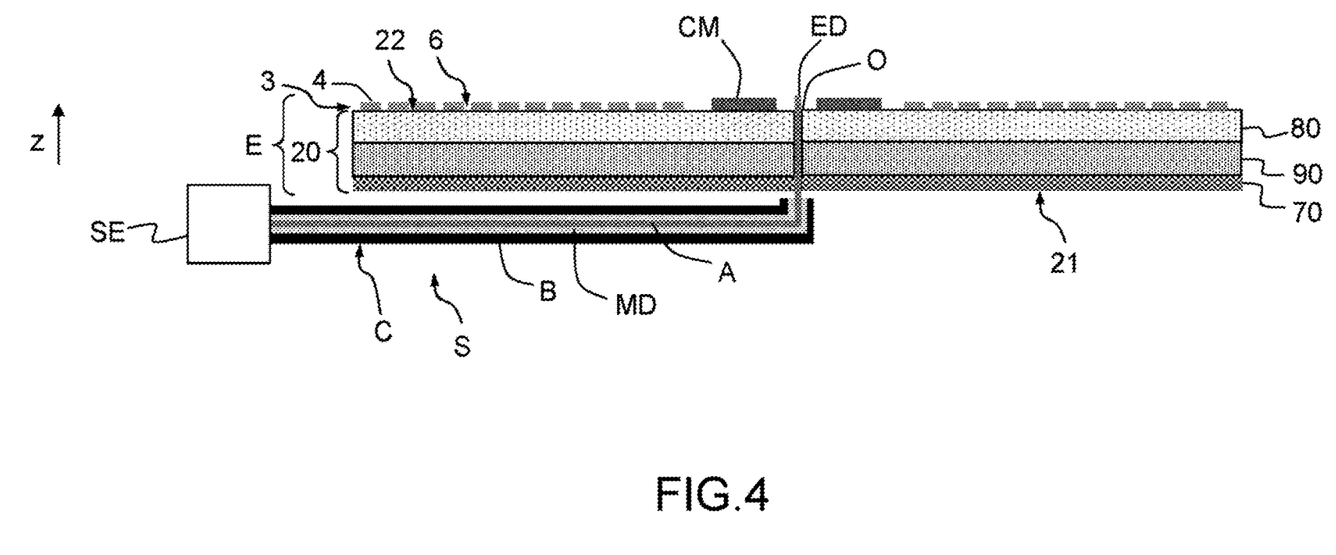

FIG. 4 schematically illustrates a partial sectional view of the metasurface device 1 of FIG. 1.

The metasurface device comprises a source S for emitting electromagnetic waves (not visible in FIG. 1) and configured and arranged so as to generate surface waves on the front surface 22 of the substrate 2.

The source makes it possible for example to emit spherical or cylindrical electromagnetic waves.

The source S is for example isotropic.

The electromagnetic waves are preferably microwaves, preferably microwave-frequency waves. The metasurface device is for example an antenna, for example a microwave antenna.

The metasurface device 1 comprises a channel O passing through the stack E along the axis z.

The source S comprises for example a coaxial cable C comprising a conductive central core A, surrounded by a dielectric material MD that is itself surrounded by a shield B. The source S also comprises an electrical source SE able to generate a microwave electrical signal that is transmitted, by the coaxial cable C, to one end ED of the central core A.

The exposed end ED passes through the substrate 2 and extends facing the metal ring CM.

The portion of the exposed end ED extending facing the antenna element 3 forms a monopole that radiates an electromagnetic wave the majority of which is diffused toward the antenna element 3 and propagates over the front face of the substrate 2 in the form of a surface wave. The rest of the wave emitted by the exposed end ED is transmitted into free space.

The antenna element 3, regardless of its scale, reflects or transforms the surface wave emitted over the front surface 22 of the substrate 2 so as to radiate, at the wavelength of the electromagnetic wave, in a direction having a component perpendicular to the front surface 22 of the substrate 2, that is to say it has a component along the axis z. The total wave radiated by the antenna element results from a recombination of the leaky waves reflected or transformed by the various conductive patches, regardless of the scale of the antenna element, that is to say even when the conductive patches 4 are electrically insulated from one another. The interference between the leaky waves radiated by the various conductive patches is radiated in a direction having a component along the axis z.

Advantageously, the central ring CM is configured and arranged to optimize the coupling rate between the wave generated by the antenna element 3 at a predetermined frequency. The configuration of the central ring CM depends on the frequency of the wave generated by the monopole ED.

The antennas are conventionally circular as in FIG. 1, but may have another geometric shape, such as for example a rectangular shape, for example a square shape.

The substrate 20 comprises a stack of a plurality of layers comprising the ground layer 70, a connection layer 80 and an intermediate layer 90.

The ground layer 70 is continuous and extends facing the entire antenna element 3.

The ground layer 70 is able to have a ground plane function allowing the transmission of the surface wave over the front surface 22, from the exposed end ED to the conductive patches 4, that is to say to the antenna element 3, or vice versa, so that the antenna element 3 radiates in a direction having a component perpendicular to the front surface 22 of the substrate 20, that is to say a component along the axis z.

The ground layer 70 is advantageously made of metal or transparent conductive oxide (TCO), such as for example indium tin oxide (ITO). Transparent conductive oxides (TCO) have the particular property of being simultaneously electrically conductive and transparent to light in the optical domain.

In the non-limiting example of FIG. 4, the ground layer 70 comprises the rear face 21 of the substrate 20.

The ground layer 70 is electrically connected to the coaxial C and more particularly to the shield B of the coaxial.

The intermediate layer 90 has the function of electrically insulating the ground layer 70 from the connection layer 80.

The intermediate layer 90 is for example made of glass, for example of silicon dioxide or borosilicate, which has the advantage of growing easily on silicon.

The connection layer 80 is a layer of photoconductive semiconductor material. The connection layer 80 is in direct physical contact with the conductive patches 4. In other words, the connection layer 80 comprises the front face 22 of the substrate 20.

The semiconductor material is insulating when it is not illuminated and is able to be conductive when it is illuminated at a reconfiguration wavelength $\lambda r$. The semiconductor material changes from the insulating state to the conductive state through photoconductivity.

Illuminating an area of the connection layer 80 in an illuminated area thus makes the semiconductor material conductive in the illuminated area only. Illuminating an area of the connection layer 80 makes it possible to electrically connect, in pairs, only the metal patches 4 of the antenna element 3 that are separate and connected by a continuous area of the connection layer that is located in the illuminated area and connects the conductive patches 4, and thus form a group of conductive patches 4 that are electrically connected to one another.

The optical reconfiguration of the antenna element 3 uses photoconductivity to make the connection layer 80 conductive at the gaps 6 between the conductive patches 4. This optical control has the advantage of being contactless and of being fast. The reconfiguration speed depends primarily on the characteristics of the semiconductor material that is used to form the connection layer and of the laser source that is used. It may vary from a few ms to a few ps.

It is thus possible to reconfigure the antenna element 3 by changing from an antenna element 3 forming a checkerboard of conductive patches 4 that are electrically insulated from one another, when the connection layer 80 is not illuminated at the reconfiguration wavelength $\lambda r$, to an antenna element comprising one or more groups of conductive patches that are electrically connected to one another and, optionally, patches that are electrically insulated from all of the other patches, when the connection layer 80 is illuminated at the reconfiguration wavelength $\lambda r$.

The proposed configuration therefore makes it possible to optically modify the radiation law of the antenna element 3 by selectively illuminating one or more areas of the connection layer 80 at the reconfiguration wavelength $\lambda r$.

The proposed metasurface device is therefore capable, without physically modifying the stack E or the array of conductive patches 4, of exhibiting various radiation laws. It is enough to provide an optical illumination device able to illuminate the connection layer appropriately for the desired radiation law. The metasurface device may therefore be employed for various uses.

Moreover, the optical control makes it possible to limit electromagnetic interference. The optical control is also decorrelated from the electrical control of the source S. It ensures independence between the antenna reconfiguration function and the antenna radiation function, the emission of the spherical wave being controlled electrically.

The proposed solution is relatively simple to implement since it comprises a single optical source for reconfiguring the antenna. It is more reliable than a solution that might comprise one optical source per spot to be created on the connection layer to obtain the desired radiation law.

Figure 5:
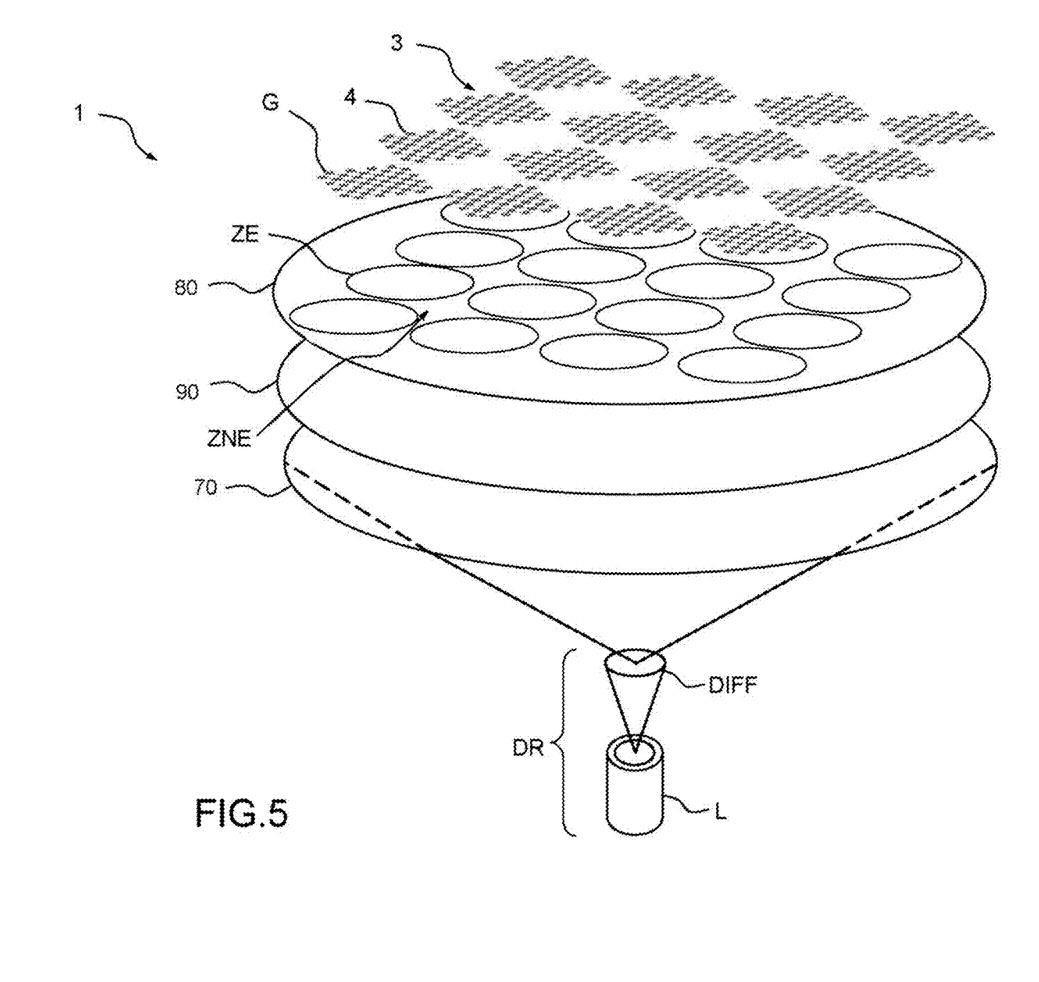

FIG. 5 schematically shows an exploded view of the metasurface device according to the invention when it furthermore comprises an optical reconfiguration device DR for optically reconfiguring the antenna element 3.

For the sake of simplification, the channel O and the source S are not shown in FIG. 5.

The reconfiguration device DR for the antenna is able to illuminate a set of at least one area, called illuminated area ZE, of the connection layer 80 such that the connection layer is conductive only in the set of at least one illuminated area ZE, so as to electrically connect, in pairs with one another, only the metal patches 4 of the antenna element that are separate and connected by continuous areas of the connection layer 80 that are located completely within an illuminated area ZE of the set of at least one illuminated area ZE so as to form at least one group G of conductive patches 4 that are electrically connected to one another.

Advantageously, the reconfiguration device DR comprises a single optical reconfiguration source SR. The reconfiguration source SR is configured to emit an optical beam at the reconfiguration wavelength $\lambda r$.

The metasurface device 1 furthermore comprises a diffractive optical device DIFF that makes it possible, using the optical beam emitted by the source SR, through diffraction, to illuminate the set of at least one illuminated area ZE of the connection layer at the reconfiguration wavelength $\lambda r$.

Advantageously, as in the example of FIG. 5, the diffractive device DIFF makes it possible to illuminate, at the reconfiguration wavelength $\lambda r$, an array of continuous illuminated areas ZE (or spots) of the connection layer 80, the illuminated areas ZE being spaced from one another and separated by a non-illuminated area ZNE of the connection layer 80, such that the connection layer 80 is conductive only in the illuminated areas ZE. The light spots formed on the connection layer 80 by the diffractive optical device DIFF, that is to say the illuminated areas ZE, are rounded in shape in the non-limiting example of FIG. 5 but could very well have different shapes. The source S is not shown in this figure for reasons of clarity.

The illuminated areas ZE of the layer 80 are separated by a non-illuminated area ZNE. The illuminated areas ZE are spaced from one another. This makes it possible to create groups of conductive patches that are electrically connected to one another, the groups being electrically insulated from one another.

As a variant, the array may comprise a set of at least illuminated areas delimiting an array of non-illuminated areas. The illuminated areas are spaced from one another. This makes it possible to create groups of conductive patches that are electrically connected to one another, the groups being electrically connected to one another.

As a variant, the array may comprise at least one illuminated area completely surrounded by a non-illuminated area and at least one non-illuminated area completely surrounded by an illuminated area.

The array of illuminated areas ZE corresponds to the image projected by the reconfiguration device DR onto the front face 22 of the substrate 20. The front face 22 of the substrate 20 is the image plane of the reconfiguration device DR.

The white areas of the antenna element 3 of FIG. 5 represent the areas in which the conductive patches 4 are electrically disconnected from one another, and the checkerboard areas represent the groups G of conductive patches 4 that are electrically connected to one another.

The reconfiguration device DR may comprise a set of at least one focusing lens for focusing the image formed by the diffractive device DIFF on the front face 22 of the substrate 20.

The proposed solution makes it possible to electrically connect, in pairs, only the metal patches 4 of the antenna element 3 that are separate and connected by a continuous area of the connection layer 80 that is located completely within an illuminated area of the set of at least one illuminated area so as to form an array of a group G of conductive patches 4 that are electrically connected to one another.

This solution makes it possible, for example, by choosing the diffractive optical device DIFF appropriately, to obtain a multi-scale antenna element 3 able to exhibit unitary patterns corresponding to the conductive patches and a pitch equal to that of the array of conductive patches 4. The antenna element is also able to exhibit unitary patterns corresponding to the groups of conductive patches that are electrically connected to one another, and therefore a pitch corresponding to a multiple of the pitch of the array of conductive patches 3.

In the particular embodiment of FIG. 5, each illuminated area ZE of the connection layer 80 comprises a plurality of gaps 6 and openings 5. Indeed, each illuminated area ZE comprises a group of more than two metal patches 4, such that the illumination of the illuminated area ZE at the wavelength $\lambda r$ ensures the electrical connection between all of the metal patches 4 of the antenna element 3 that are located within the illuminated area.

As a variant, the diffractive optical device DIFF is able to illuminate a single gap 6 or a single continuous area connecting two adjacent patches 4. Each illuminated area makes it possible to connect only two adjacent patches to one another. The solution of FIG. 5 is however easier to implement.

There are many diffractive optical devices DIFF that make it possible to illuminate an array of illuminated areas, such as for example diffractive optical elements (DOE) or optical devices based on a matrix of micromirrors or DMD (digital micromirror device).

Such diffractive optical devices DIFF make it possible to generate, through diffraction, a one-dimensional or two-dimensional array of illuminated areas or non-illuminated areas. The array may be regular or irregular.

The diffractive optical device DIFF may be configured to be able to illuminate, using the beam radiated by the source, a single set of illuminated areas of the conductive layer, such as for example a diffractive optical device DIFF based on a diffractive optical element DOE located at a fixed distance from the source SR and from the connection layer.

The diffractive optical device DIFF may be configured to make it possible to illuminate, using the beam radiated by the source, SR, alternately, various arrays of illuminated areas of the connection layer 80, each array of illuminated areas being different from the other sets of illuminated areas.

This is for example the case of a diffractive optical device DIFF comprising a matrix of micromirrors or DMD, a control device and a set of actuators making it possible, upon command from the actuator, to individually displace each of the mirrors between a first position, in which it reflects light toward a diffusing lens, and a second position, in which it reflects light toward an absorbent surface, such that the matrix of micromirrors illuminates, using the beam radiated by the reconfiguration source SR, an array of groups of conductive patches 4 that are connected to one another, taken from among a set of predetermined arrays.

The control device comprises for example a memory storing a set of arrays of groups of conductive patches 4 that are connected to one another, taken from among a set of predetermined arrays and associating, with each of these arrays, the position taken from among the first position and the second position, to be occupied by each of the micromirrors such that the matrix of micromirrors illuminates the array under consideration using the beam radiated by the reconfiguration source.

The illuminated continuous areas ZE or the non-illuminated continuous areas may differ for example in terms of their shape and/or their size and/or their orientation in a reference frame tied to the antenna element. Each of the arrays of groups of patches that are electrically connected to one another may be one-dimensional or two-dimensional, periodic or aperiodic.

The proposed solution therefore makes it possible to modify the radiation law of the antenna by modifying the frequency, for example by modifying the pitch of the array of conductive patches and/or the direction of the antenna radiation, for example by modifying the orientation of groups of interconnected cells. The modification of the direction of the radiation of the antenna is equivalent to spatial scanning of the beam radiated by the antenna.

In the embodiment of FIG. 5, the reconfiguration device DR is configured to illuminate the substrate 20 or the stack E on the rear face. In other words, the set of at least one radiation projected onto the stack E is projected in the direction from the front face 22 toward the rear face 21 of the substrate. The ground layer 70 is advantageously made of a material transparent to the reconfiguration wavelength λr so as not to absorb the radiation projected by the substrate reconfiguration device DR, such that it makes the connection layer 90 conductive in the illuminated areas so as to interconnect conductive patches.

Figure 6:
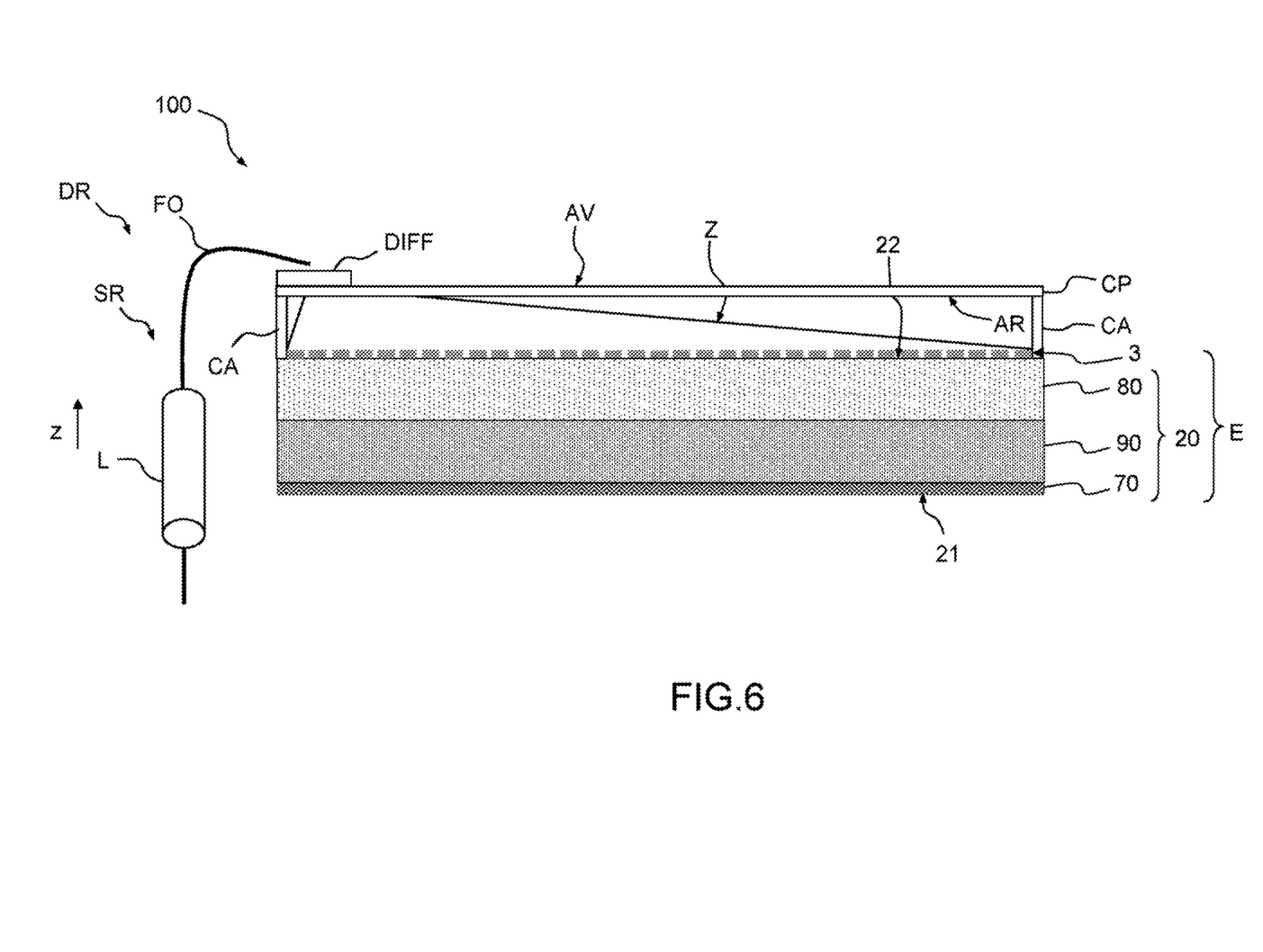

In one variant of the metasurface device 100, shown in FIG. 6, the reconfiguration device DR is configured to illuminate the stack E on the front face, that is to say the set of at least one radiation projected onto the stack E is projected in the direction of the front face 22 toward the rear face 21 of the substrate 20.

This embodiment is less constrictive and may be less expensive than illumination on the rear face 21, since the ground layer does not mask the connection layer. The choice of the material forming the ground layer may be wider. The ground layer may be formed as described above or be made of a material that absorbs radiation at the reconfiguration wavelength λr. It may for example be an inexpensive metal layer.

In FIG. 6, the diffractive device DIFF is mounted facing the antenna element 3. For the sake of simplicity, the channel O and the source S are not shown in FIGS. 6 and 7. The diffractive device DIFF has for example substantially the shape of a flat plate substantially parallel to the front face 21 of the substrate 20.

The diffractive device DIFF is for example mounted on a protective cover CP of the metasurface or radome. This cover CP has the shape of a plate substantially parallel to the front face 21 of the substrate 20 and is arranged at a distance from the antenna element 3 along the axis z. The cover CP is advantageously transparent in the optical domain, at least to the reconfiguration wavelength λr, thereby making it possible to arrange the diffractive optical device DIFF on the front face AV of the cover, without interfering with the reconfiguration of the antenna element 3.

The diffractive device illuminates the illuminated areas ZE contained within an overall area Z.

As a variant, the diffractive device DIFF is mounted on a rear face AR of the cover CP, this rear face AR facing the antenna element 3.

The source SR may comprise a remote laser L and an optical fiber that transmits the radiation emitted by the source SR to one end of the optical fiber FO arranged facing the diffractive optical device DIFF. The end of the optical fiber FO is held facing the diffractive optical device DIFF by a support.

Figure 7:
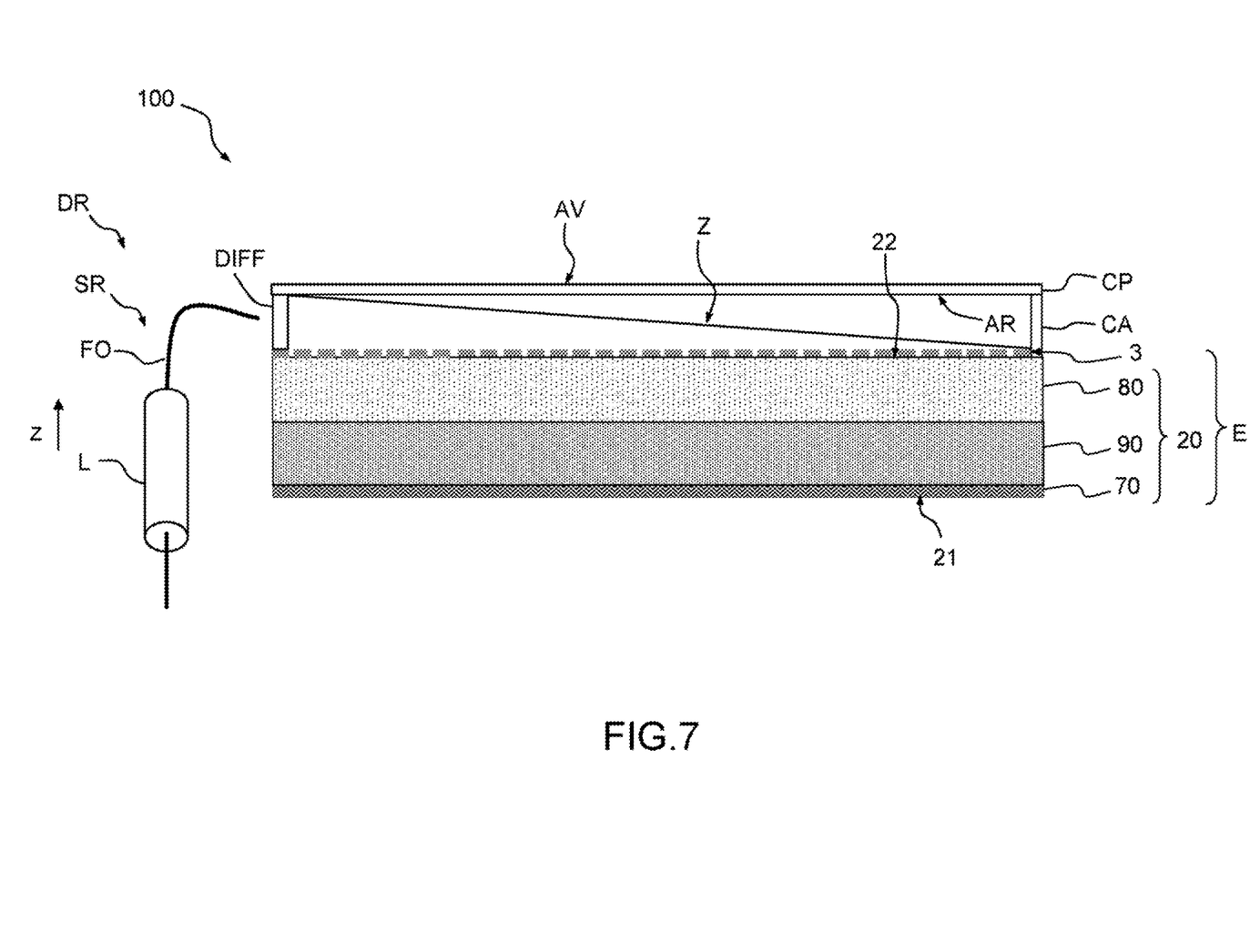

In the variant shown in FIG. 7, the diffractive device DIFF of the metasurface device 1001 is mounted on a frame CA holding a protective cover CP at a distance from the antenna element 3.

The diffractive device DIFF has for example substantially the shape of a flat plate substantially perpendicular to the front face 22 of the substrate 20. The front face 22 is then illuminated at a grazing angle.

This configuration makes it possible to limit the masking of the antenna element by the diffractive optical device DIFF.

Figure 8:
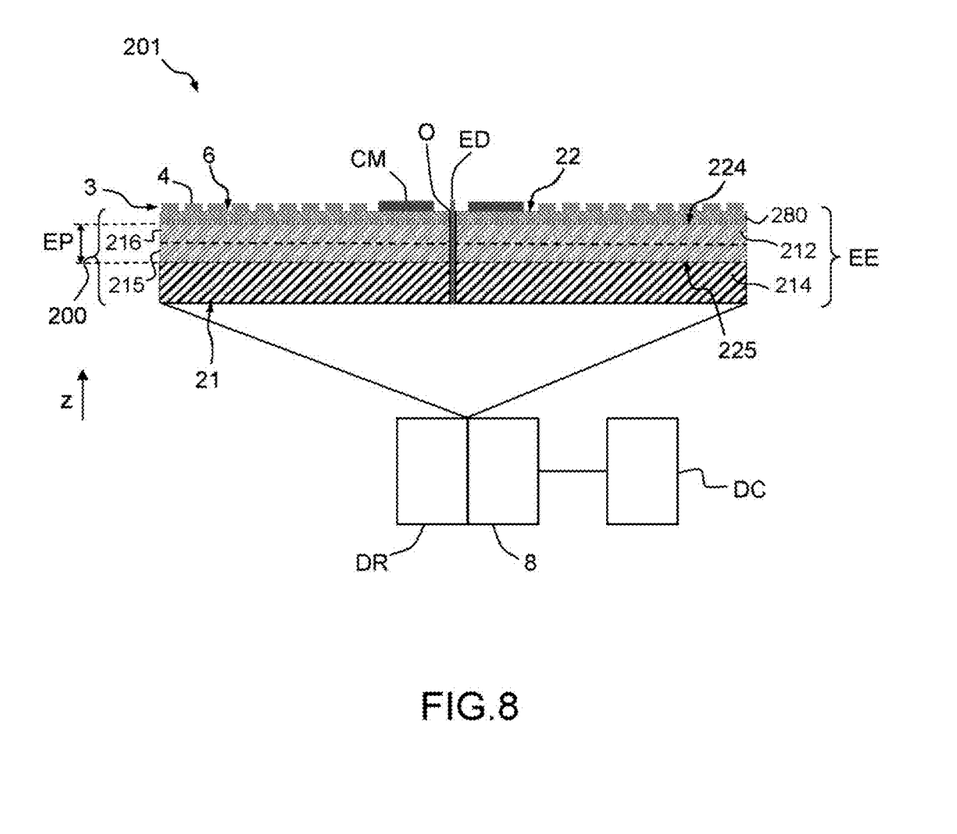

FIG. 8 shows a variant metasurface device 201. The metasurface device 201 differs from that of FIG. 4 in terms of the substrate 200 and, more particularly, in that the ground layer 212 is made of photoconductive semiconductor material. For the sake of simplicity, the coaxial and the electrical source SE are not shown in FIG. 8.

Advantageously, the metasurface device comprises the connection layer 280 and the ground layer 212, the connection layer 280 being interposed between the antenna element 3 and the ground layer 212. The connection layer 280 is arranged on the front face 224 of the ground layer 212.

The substrate S also comprises an insulating layer 214 formed on the rear face 225 of the ground layer 212. The insulating layer 214 is transparent to a switching wavelength λc.

For example, the insulating layer is transparent to optical beams. The insulating layer 214 is for example made of glass, for example of silicon dioxide or borosilicate, which has the advantage of growing easily on silicon.

Advantageously, the ground layer 212 is able to be in an insulating state in which it prevents the propagation of the surface wave over the front surface 22 of the substrate 20 so as to prevent the antenna element For example, the ground layer 212 is able to be in an insulating state in which it prevents the propagation of the surface wave (generated by the source S) over the front surface 22 of the substrate 20, from the emission and/or reception device to the conductive patches 4, or vice versa, thereby preventing the antenna element 3 from radiating at the wavelength of the electromagnetic wave, in a direction having a non-zero component along the axis z.

The ground layer 212 is also able to be in a conductive state in which the ground layer 212 has a ground plane function allowing the propagation of the surface wave over the front surface 22 of the substrate 20. The antenna element 3 thus transforms or reflects the surface wave and radiates an electromagnetic wave in a direction having a component perpendicular to the front surface 22 of the substrate 20, that is to say a component along the axis z.

The ground layer 212 is able to change from the insulating state to the conductive state through photoconductivity under the effect of the illumination of the ground layer 212 by an optical beam at a wavelength called a switching wavelength λc. It is also able to be kept in the conductive state when the illumination is maintained.

Thus, by optically controlling the ground layer 212 so as to change it from the insulating state to the conductive state, the metasurface device 201 is changed from a turned-off state, in which it is unable to radiate under the effect of the radiation from the source S, to a turned-on state, in which it is able to radiate under the effect of the radiation from the source S.

In order to optically control the ground layer 212, the metasurface device 201 advantageously comprises a switching source 8 able to change from a state in which it does not illuminate the ground layer, such that the ground layer 212 is in the insulating state, to a state in which it illuminates the ground layer 7 at the switching wavelength, such that it changes from the insulating state to the conductive state.

The metasurface device advantageously comprises a control device DC for controlling the switching source 8 so as to change it from a turned-on state, in which it illuminates the ground layer, such that the ground layer is in the conductive state, to a turned-off state, in which it does not illuminate the ground layer, and vice versa.

The control of the ground layer 212 is thus independent of the control of the electromagnetic-wave source generating the spherical wave for exciting the metasurface and therefore the signal radiated by the metasurface device.

The temporal precision of optical control is better than that of electrical control. This solution therefore makes it possible to obtain very good temporal precision with regard to a time at which the metasurface device is turned on or off and therefore with regard to a time at which electromagnetic radiation is emitted. Indeed, the antenna radiates only when the ground structure is illuminated so as to create the ground plane.

This temporal precision makes it possible to carry out precise measurements, for example for radar applications or in telecommunications. It makes it possible for example to obtain good precision with regard to the measurement of the round-trip time of the wave emitted to the illuminated object.

In the remainder of the text, thickness of a portion of the device is understood to mean its dimension along the axis z of the stack.

The photoconductive semiconductor material of the ground layer 212 is chosen such that the ground layer 212 has a depth of penetration E1 less than the thickness E of the ground layer 212 at the switching wavelength λc, such that, when the entire rear face 225 of the ground layer 212 is illuminated at the switching wavelength λc, the ground layer 212 comprises:
- a conductive section 215 forming the ground plane and extending, from the rear face 225, over a thickness of the conductive section less than the thickness E of the ground layer 212, and
- an insulating section 216 extending over the rest of the thickness E, such that the conductive section 215 is insulated from the antenna element 3 by the insulating section 216 when the connection layer 280 is conductive.

In the embodiment of FIG. 8, the reconfiguration device DR is configured to illuminate the rear face 22 of the substrate 202.

The ground layer 212 is advantageously made of a photoconductive material transparent to the reconfiguration wavelength λr, which is different from the switching wavelength λc, and the connection layer is made of a material transparent to the switching wavelength λc.

Advantageously, materials transparent to respective wavelengths that are spaced from one another are chosen, for example one material that is transparent at 800 nm and has a high absorption coefficient at 1.5 micrometers, and another material that is substantially transparent at 1.5 micrometers and has a high absorption coefficient at 800 nm.

It is possible for example to choose a GaAs ground layer and a connection layer made of two-dimensional semiconductor material.

As a variant, the reconfiguration device DR is configured to illuminate the stack EE on the front face. The connection layer 280 advantageously has a thickness such that the optical beams illuminating the front face 22 of the substrate 20 at the wavelength λr are absorbed completely by the connection layer 280, thereby making it possible to produce the ground layer from a material that is absorbent at the wavelength λr.

The thickness of the connection layer is then advantageously chosen so as to be greater than the depth of penetration of light at the wavelength λr.

As a variant, the ground layer is the connection layer. It is possible to reconfigure the metasurface device using the reconfiguration device DR through front-face illumination when the switching source 8 illuminates the substrate on the rear face by choosing the wavelengths λr and λc and the thickness of the connection layer such that the ground layer comprises an insulating section electrically insulating the illuminated areas ZE that are made conductive by the reconfiguration device DR and the conductive area that is made conductive by the switching source 8.

Figure 9:
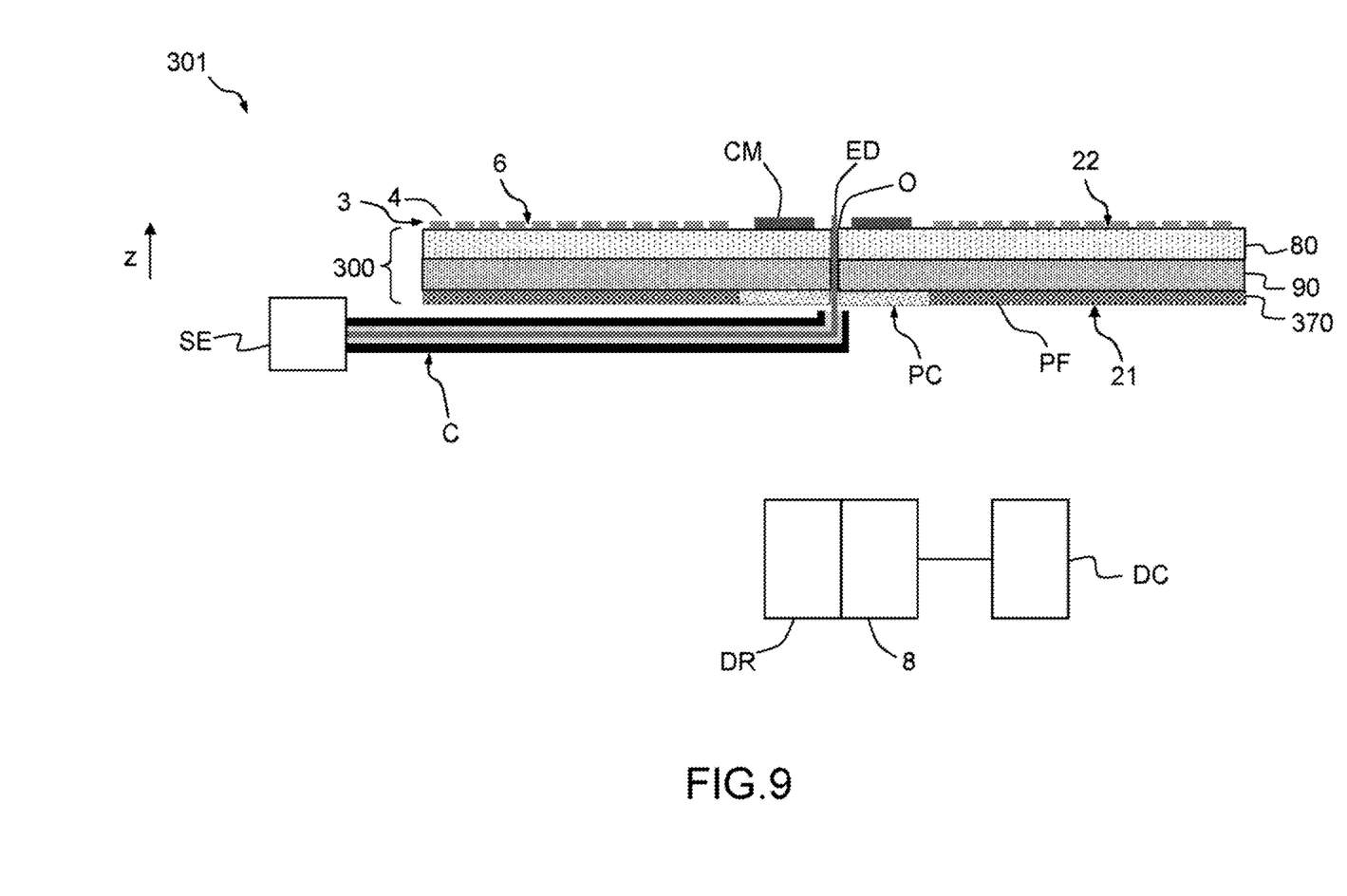

FIG. 9 shows a variant metasurface device 301. The metasurface device 301 differs from that of FIG. 4 in terms of the substrate 300 and, more particularly, in that the ground layer 370 is able to change from an insulating state to a conductive state through photoconductivity under the effect of the illumination of the ground layer 370 by a source 8 at the switching wavelength λc.

The ground layer 370 comprises a photoconductive central portion PC surrounding the channel O and a conductive peripheral portion PF surrounding the photoconductive central portion PC.

The photoconductive central portion PC made of semiconductor material has the shape of a ring surrounding and delimiting the channel O.

The conductive peripheral portion PF has the shape of a ring surrounding the photoconductive central portion PC.

The conductive peripheral portion PF is joined to the photoconductive central portion PC.

The photoconductive central portion PC is able to be alternately in an insulating state and in a conductive state.

The photoconductive central portion PC is in the insulating state when it is not illuminated.

The photoconductive central portion PC is able to change to the conductive state, in which it is completely conductive, when it is illuminated at the switching wavelength λc through photoconductivity.

The photoconductive central portion PC is made of a semiconductor material such as for example silicon, gallium arsenide GaAs or a two-dimensional material such as for example a transition metal dichalcogenide (TMD) or of an organic semiconductor material.

The conductive peripheral portion PF is for example made of metal or of indium tin oxide (ITO), which is transparent in the visible spectrum.

When the photoconductive central portion PC is in the insulating state, it prevents the propagation of the surface wave generated by the source S over the front surface 22 of the substrate 300 from the source to the antenna element 3, that is to say to the conductive patches 4, or vice versa.

When the photoconductive central portion PC is in the conductive state, the ground layer 370 is substantially completely conductive. It is continuously conductive facing the whole of the antenna element 3 or metasurface. The ground layer 7 therefore has a ground plane function allowing the transmission of the surface wave over the front surface 22 of the substrate 2. The antenna element 3 reflects or transforms the surface wave. The antenna element 3 radiates a total wave at the wavelength of the electromagnetic wave in a direction comprising a component perpendicular to the upper surface 22.

The switching source 8 comprises for example a laser source, for example a vertical-cavity surface-emitting laser (VCSEL) diode or a light-emitting diode.

The switching source 8 comprises for example a mirror for deflecting the optical beam emitted by the laser source such that the optical beam illuminates the desired surface.

The central photoconductive portion PC is advantageously made of a photoconductive material transparent to the reconfiguration wavelength λr, which is different from the switching wavelength λc, and the connection layer 80 is made of a material transparent to the switching wavelength λc.

Figure 10:
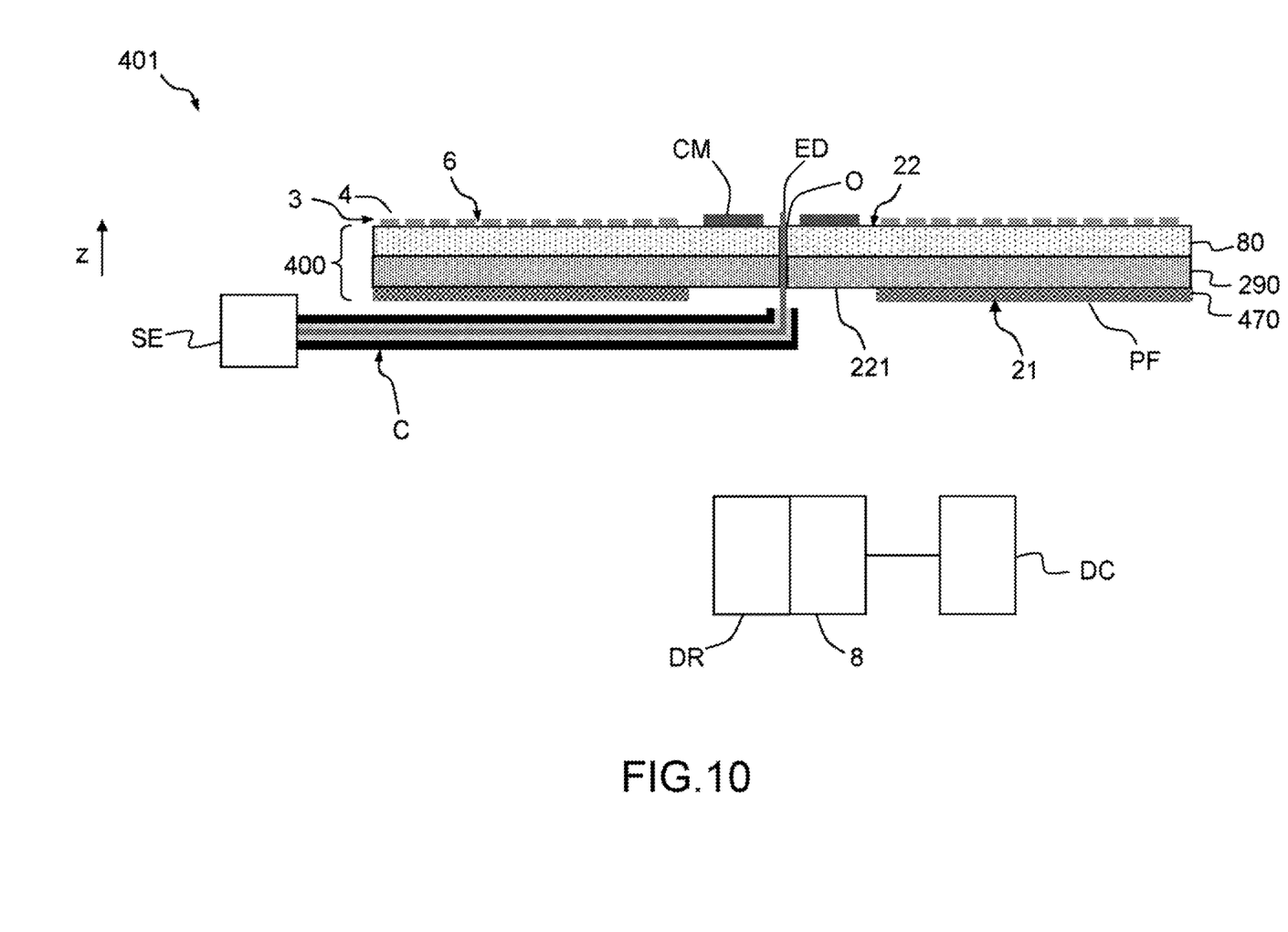

FIG. 10 shows a variant metasurface device 301. The metasurface device 301 differs from that of FIG. 4 in terms of its substrate 302, which differs from the substrate 2 of FIG. 4 in terms of the ground layer 470, which does not have the central portion PC, and in terms of the intermediate layer 290, which is made of photoconductive semiconductor material chosen such that, when the source 8 illuminates the central portion 292 of the rear face 291 of the intermediate layer 290 at the switching wavelength λc, this central portion 292 becomes conductive and the ground layer 470 has the ground plane function. The ground layer 470 comprises the rear face 221 of the substrate 302.

The rear face 291 of the intermediate layer 290 is joined to the ground layer 470.

The central portion 292 connects the channel O to the peripheral portion PF.

The device therefore comprises a ground structure comprising the ground layer 470; comprising only the peripheral portion PF, and the central portion 292 of the rear face 291 of the intermediate layer 290. The thickness EP of the intermediate layer 290 is greater than the depth of penetration of the material forming it, such that the intermediate layer 290 ensures electrical insulation between the ground plane and the conductive patches 4.

Advantageously, the material forming the intermediate layer 290 is transparent to the reconfiguration wavelength λr, which is different from the switching wavelength λc, and the connection layer 80 is made of a material transparent to the switching wavelength λc.

The switching and/or reconfiguration wavelengths are for example located in the infrared domain. They are for example between 800 nm and 1500 nm, thereby making it possible to use conventional semiconductor materials such as silicon and gallium arsenide (GaAs). The switching and reconfiguration wavelengths may be located throughout the optical domain. They may for example be located in the ultraviolet domain or the visible. It is possible for example to use two-dimensional semiconductor materials or gallium nitride (GaN).

In the embodiment of FIG. 4, the metasurface device comprises an electromagnetic-wave emission source S, such that the metasurface device is able to radiate an electromagnetic wave. More generally, and in a manner applicable to all of the embodiments, the metasurface device comprises an emission and/or reception device able to emit and/or receive an electromagnetic wave, the emission and/or reception device being configured and arranged such that the electromagnetic wave that it emits or receives is able to propagate in the form of a surface wave over the front surface of the substrate. In the case of a reception device, the antenna element is able to reflect or transform a wave moving in a direction comprising a non-zero component along the axis x so as to transform it into a wave propagating over the front surface of the substrate and received by the reception device, which may comprise a coaxial cable as shown in FIG. 4. The device then comprises means for processing the signal received by the coaxial cable. The emission and/or reception device is intended to operate at a certain wavelength.

The invention claimed is:

1. A metasurface device comprising:
a substrate having a rear surface and a front surface, the substrate comprising a ground structure able to have a ground plane function,
an emission and/or reception device able to emit and/or receive an electromagnetic wave, the emission and/or reception device being configured and arranged such that the wave is able to propagate in the form of a surface wave over the front surface of the substrate,
an antenna element comprising a two-dimensional array of electrically conductive patches arranged on the front surface of the substrate, spaced from one another and having dimensions smaller than the operating wavelength of the emission and/or reception device, the antenna element being able to radiate, under the effect of the propagation of a surface wave over the front surface of the substrate, in a direction having a component perpendicular to the front surface of the substrate when the ground structure has a ground plane function, the substrate comprising a layer, called a connection layer, made of photoconductive semiconductor material, in direct physical contact with the conductive patches, the semiconductor material being insulating when it is not illuminated and able to be conductive when it is illuminated at a wavelength called a reconfiguration wavelength.

2. The metasurface device as claimed in claim 1, comprising an optical reconfiguration device (DR) able to illuminate a set of at least one area, called illuminated area, of the connection layer such that the connection layer is conductive only in the set of at least one illuminated area, so as to electrically connect, in pairs, the metal patches of the antenna element that are separate and connected by a continuous area of the connection layer that is located completely within an illuminated area (ZE) of the set of at least one illuminated area (ZE) so as to form at least one group (G) of conductive patches that are electrically connected to one another.

3. The metasurface device as claimed in claim 2, wherein the optical reconfiguration device (DR) comprises a single optical reconfiguration source (DIFF) able to emit an optical beam at the reconfiguration wavelength and a diffractive optical device (DIFF) that makes it possible, using the optical beam, through diffraction, to illuminate the set of at least one illuminated area (ZE) at the reconfiguration wavelength.

4. The metasurface device as claimed in claim 3, wherein the diffractive device (DIFF) makes it possible to illuminate an array of illuminated areas (ZE) of the connection layer or a set of at least one illuminated area delimiting areas of the connection layer that are not illuminated by the diffractive device (DIFF).

5. The metasurface device as claimed in claim 4, wherein the diffractive device (DIFF) is able to alternately illuminate various of at least one illuminated area of the connection layer.

6. The metasurface device as claimed in claim 1, comprising a ground structure able to have a ground plane function, the ground structure being able to be alternately in an insulating state, wherein it prevents the propagation of the surface wave over the front surface of the substrate from the emission and/or reception device to the conductive patches, or vice versa, and in a conductive state, wherein the ground structure has a ground plane function, allowing the propagation of the surface wave over the front surface of the substrate from the emission and/or reception device to the conductive patches, or vice versa, the ground layer being able to change from the insulating state to the conductive state through illumination of the ground layer by an optical beam at a wavelength called a switching wavelength.

7. The metasurface device as claimed in claim 2, wherein the reconfiguration device (DR) is configured and arranged to illuminate the substrate on the rear face.

8. The metasurface device as claimed in claim 2, wherein the reconfiguration device (DR) is able to illuminate the substrate on the front face.

9. The metasurface device as claimed in claim 8, wherein the diffractive device (DIFF) is mounted on a cover of the metasurface device, the cover being arranged facing the antenna element at a distance from the antenna element.

10. The metasurface device as claimed in claim 8, wherein the diffractive device (DIFF) has the shape of a substantially flat plate substantially perpendicular to the front surface.

* * * * *